(12) United States Patent
Blanchard St-Jacques et al.

(10) Patent No.: US 12,199,490 B2
(45) Date of Patent: Jan. 14, 2025

(54) COOLING SYSTEM FOR HIGH-DENSITY MOTOR

(71) Applicant: DANA TM4 INC., Boucherville (CA)

(72) Inventors: Benoit Blanchard St-Jacques, Sainte-Julie (CA); Anthony Riendeau, Boucherville (CA); Hakim Nechadi, Montreal (CA)

(73) Assignee: DANA TM4 INC., Boucherville (CA)

(*) Notice: Subject to any disclaimer, the term of this patent is extended or adjusted under 35 U.S.C. 154(b) by 323 days.

(21) Appl. No.: 17/664,024

(22) Filed: May 18, 2022

(65) Prior Publication Data

US 2023/0402896 A1    Dec. 14, 2023

(51) Int. Cl.
| | |
|---|---|
| H02K 5/15 | (2006.01) |
| H02K 5/20 | (2006.01) |
| H02K 9/19 | (2006.01) |
| H02K 11/40 | (2016.01) |

(52) U.S. Cl.
CPC ............ *H02K 5/15* (2013.01); *H02K 5/203* (2021.01); *H02K 9/19* (2013.01); *H02K 11/40* (2016.01)

(58) Field of Classification Search
CPC ............ H02K 5/15; H02K 5/203; H02K 9/19; H02K 11/40; H02K 3/34; H02K 3/50; H02K 9/22; H02K 9/223; H02K 1/20; H02K 1/32; H02K 3/24
See application file for complete search history.

(56) References Cited

U.S. PATENT DOCUMENTS

| | | | |
|---|---|---|---|
| 8,970,074 B2 | 3/2015 | Wagner et al. | |
| 9,077,210 B2 | 7/2015 | Bahr | |
| 9,762,106 B2 | 9/2017 | Gauthier et al. | |
| 2013/0278088 A1 | 10/2013 | Bahr | |
| 2014/0077635 A1* | 3/2014 | Hossain | H02K 15/12 310/64 |
| 2016/0164377 A1 | 6/2016 | Gauthier et al. | |
| 2017/0271957 A1 | 9/2017 | Hanumalagutti et al. | |
| 2019/0097506 A1* | 3/2019 | Hashimoto | H02K 3/38 |
| 2019/0123623 A1* | 4/2019 | Sorge | H02K 5/203 |
| 2020/0295628 A1 | 9/2020 | Reichert et al. | |
| 2021/0313862 A1* | 10/2021 | Franck | H02K 9/197 |

FOREIGN PATENT DOCUMENTS

| | | | | |
|---|---|---|---|---|
| DE | 102019218582 A1 * | 6/2021 | ......... | B23K 26/0738 |
| JP | 2012191772 A  * | 10/2012 | | |
| WO | 8802947 A1 | 4/1988 | | |
| WO | WO-2017148690 A1 * | 9/2017 | | |

* cited by examiner

*Primary Examiner* — Thomas Truong
(74) *Attorney, Agent, or Firm* — McCoy Russell LLP

(57) ABSTRACT

Methods and systems are provided for an electric motor. In one example, the electric motor may include a stator with end windings protruding axially, along a central axis of rotation of the electric motor, from a first end of the stator and a first end plate arranged at the first end of the stator. The first end plate may have an inner face with indentations configured to receive the end windings, the indentations including a thermally conductive material to interface with the end windings. In addition, the first end plate may include at least one cooling channel for flowing a coolant.

15 Claims, 8 Drawing Sheets

COOLING SYSTEM FOR HIGH-DENSITY MOTOR

TECHNICAL FIELD

The present description relates generally to methods and systems for electric motor heat management.

BACKGROUND AND SUMMARY

In automotive applications, an electric motor may be used for multiple purposes, including as a starter motor, an electric drive assist (e.g., propulsion boost) as well as pure electric drive, a generator providing electric power for onboard electric loads and charging battery banks, and as a re-generator acting to convert the kinetic energy of the vehicle to electric power for charging the battery bank during braking/deceleration of the vehicle. For example, a radial flux electric motor may be used to provide electrical energy in an electric vehicle. The radial flux electric motor, and in particular, a type of radial flux electric motor known as a permanent magnet synchronous motor (PMSM), may include a stationary stator and a rotating rotor embedded with permanent magnets. A plurality of electroconductive windings may be integrated into a core of the stator to form electromagnets. A magnetic flux field may be generated in an air gap between the permanent magnets and the electromagnets along a radial direction relative to the radial flux electric motor, e.g., along a direction perpendicular to an axis of rotation of the electric motor.

In electric motors, a torque provided by the motor is proportional to a product of the current circulating in conductors (e.g., the electroconductive windings and rotor bars) and a rate of change in a magnetic flux density at the conductors over time. Both the magnetic flux density and the current components of the torque have loss components which decrease an efficiency of the electric motor. For example, for the PMSM, as speed is increased, a stator current may decrease while a constant power output is maintained, resulting in current-related losses, e.g., copper loss. Furthermore, the copper loss, along with other types of losses, may drive heating of the electroconductive windings during operation. In order to cool the conductors in the electric motor during operation, a coolant may be routed through cavities incorporated into a structure of the PMSM, such as through an outer housing of the PMSM.

An efficiency and power density output of the electric motor is therefore constrained by dissipation of heat from the electric motor. In some examples, heat management is provided by a liquid cooling system, such as a liquid-cooled aluminum jacket surrounding the stator core. However, the liquid-cooled aluminum jacket does not directly cool end windings of the stator, e.g., terminal ends of the conductive windings protruding axially from the stator core. At the end windings, hot spots may be generated during electric motor operation that adversely impact motor performance and leads to degradation of the electric motor insulation as well as a diminished useful life duration.

Attempts to address cooling the end windings of the stator include modifying a housing of the stator to conduct heat away from the end windings. One example approach is shown by Bahr in U.S. Pat. No. 9,077,210. Therein, a housing for the stator is manufactured with an accommodating region for an end region of the stator. The accommodating region is configured to surround end windings at the end region of the stator and press tightly against the end windings. The contact between the accommodating region and the end windings allows heat generated at the end windings to be dissipated to the housing.

However, the inventors herein have recognized potential issues with such systems. As one example, the housing described by Bahr is specifically configured to cool end windings of round wires, which form flexible bundles of randomly oriented wire strands. The compression provided by the accommodating region of the housing is not applicable to end windings of different types of conductive windings, such as hairpin wires, which cannot be compressed. Furthermore, compressing the end windings against the accommodating region still allows for air to be present between the end winding and the housing which offsets the cooling effect of the housing. In addition, vibrations are transmitted to the end windings despite the compression, which may lead to degradation of the end wirings over time.

In one example, the issues described above may be addressed by an electric motor including a stator with end windings protruding axially, along a central axis of rotation of the electric motor, from a first end of the stator, a first end plate arranged at the first end of the stator, the first end plate having an inner face with indentations configured to receive the end windings, the indentations including a thermally conductive material to interface with the end windings, and at least one cooling channel to flow a coolant. In this way, a power density output by the electric motor is increased while losses and degradation of electric motor components, resulting from heat generation at the end windings, are reduced.

As one example, the end windings may be inserted into the indentations of the end plate while maintaining a gap between the end windings and surfaces of the indentations. The gap may be occupied by a filler, or potting material, that is flexible, to allow expansion of the end windings, and thermally conductive, to effectively conduct heat from the end windings to the end plate. Additionally, the potting material may be electrically insulating. Furthermore, by embedding the end windings in the potting material-filled indentations of the end plate, the end windings are mechanically supported, thereby less prone to degradation due to shocks and vibrations. Noise, vibrations, and harshness (NVH) experienced by the end windings due, at least in part, to air circulation through the end windings, may also be dampened by the potting material. Cooling of the end windings provided by the coolant enables more uniform cooling of the electric motor, thereby mitigating formation of hot spots and prolonging a useful life of the stator.

In addition, the cooling enabled by the end plate, as described herein, may cool the end windings independently and equally without comprising an integrity of an airgap of the electric motor. The cooling may offer advantages over other methods for end winding cooling, e.g., direct oil cooling, including obviating particle removal via filtration of the coolant as well as a dependency of cooling efficiency on coolant viscosity. Further, a variety of coolant types may be used, including electrically conductive coolants. In contrast, for direct oil cooling, additional pumps and tubing may be demanded, as well as complex control of an oil flow path through the electric motor, where oil flow is affected by variables such as viscosity and temperature. An insulation of the end windings may be worn away over time due to direct contact with the oil and/or conductive particles may accumulate in the oil which may lead to motor degradation. Various other issues may arise from direct oil cooling, including accumulation of oil in the airgap and formation of hot spots at conductors due to variable oil temperatures. By implementing a cooling system as described herein at the electric motor, the issues associated with other, conventional cooling systems may be alleviated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
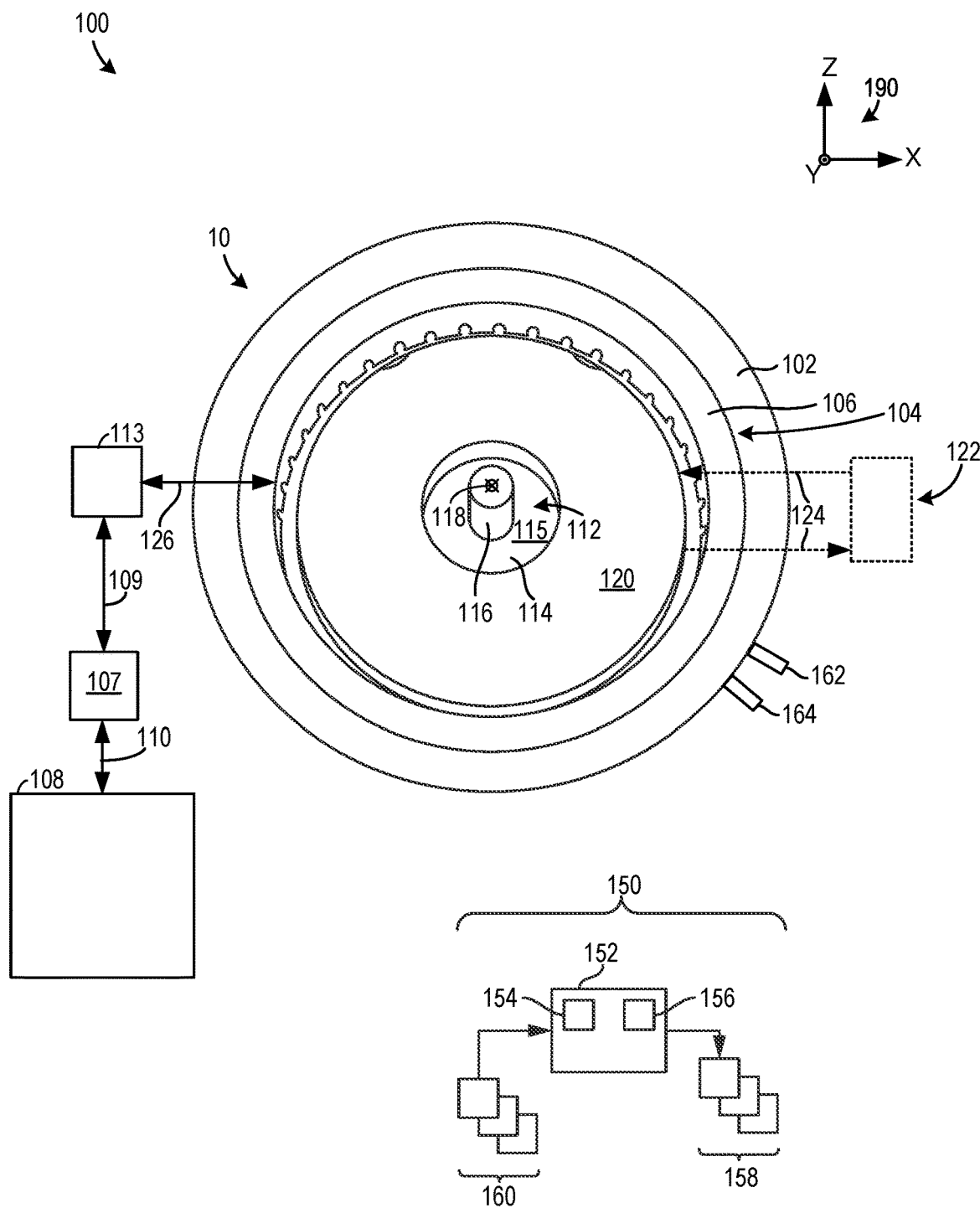
FIG. 1 shows an end view of an example of an electric motor
Figure 2:
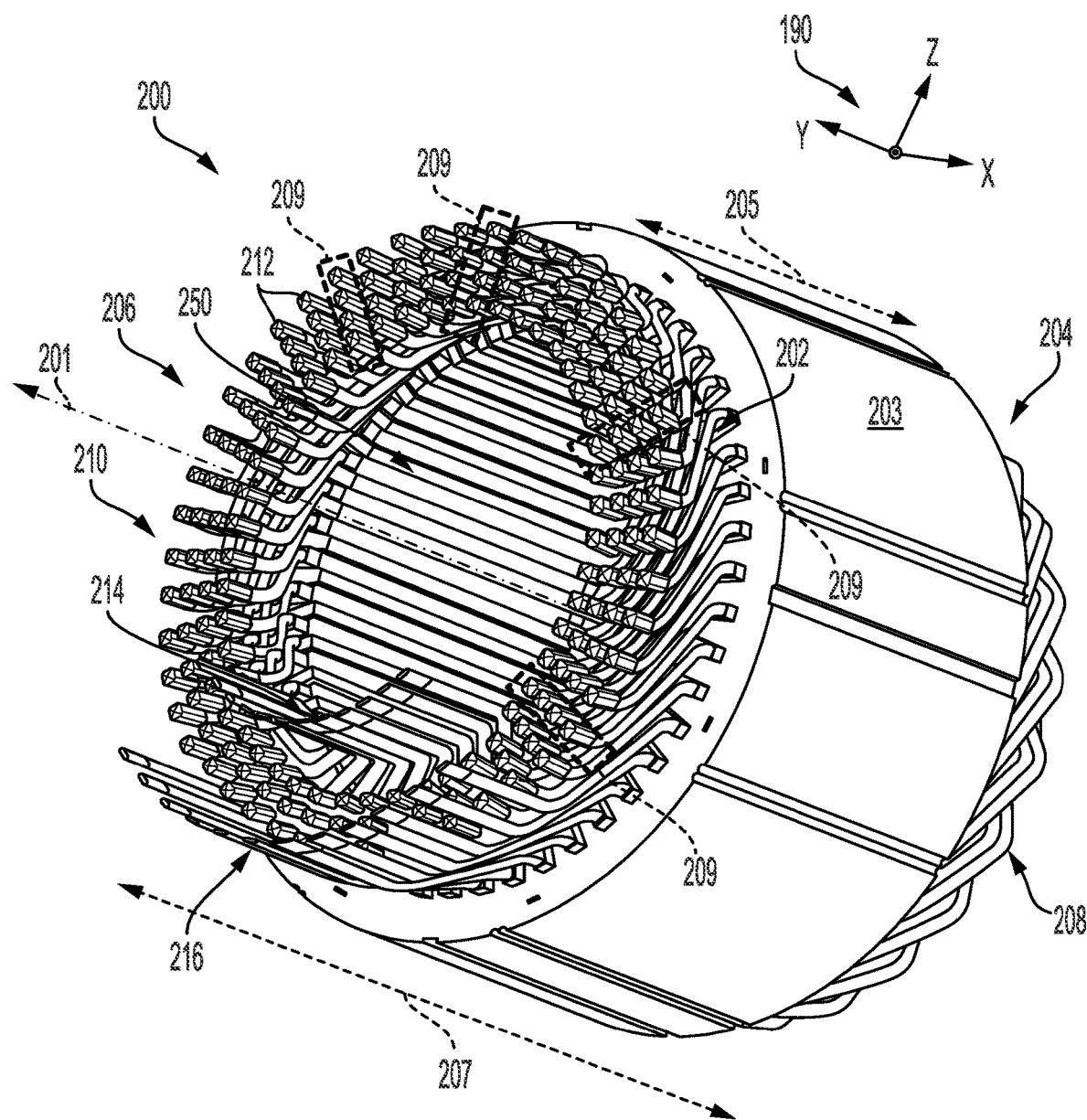
FIG. 2 shows an example of a stator which may be included in the electric motor of FIG. 1, the stator having end windings configured as hairpin end windings.
Figure 3:
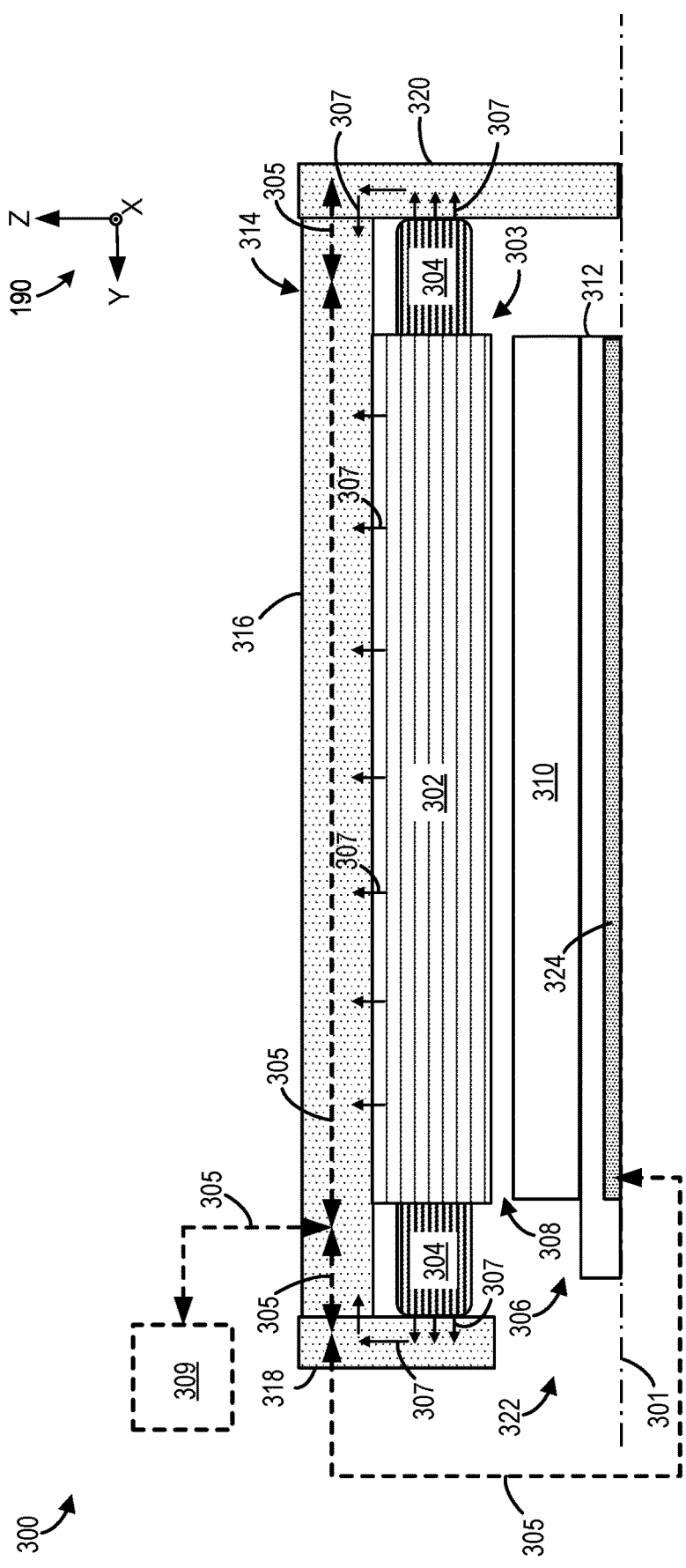
FIG. 3 shows a schematic diagram of an electric motor configured with at least one end plate for cooling end windings of the electric motor.
Figure 4:
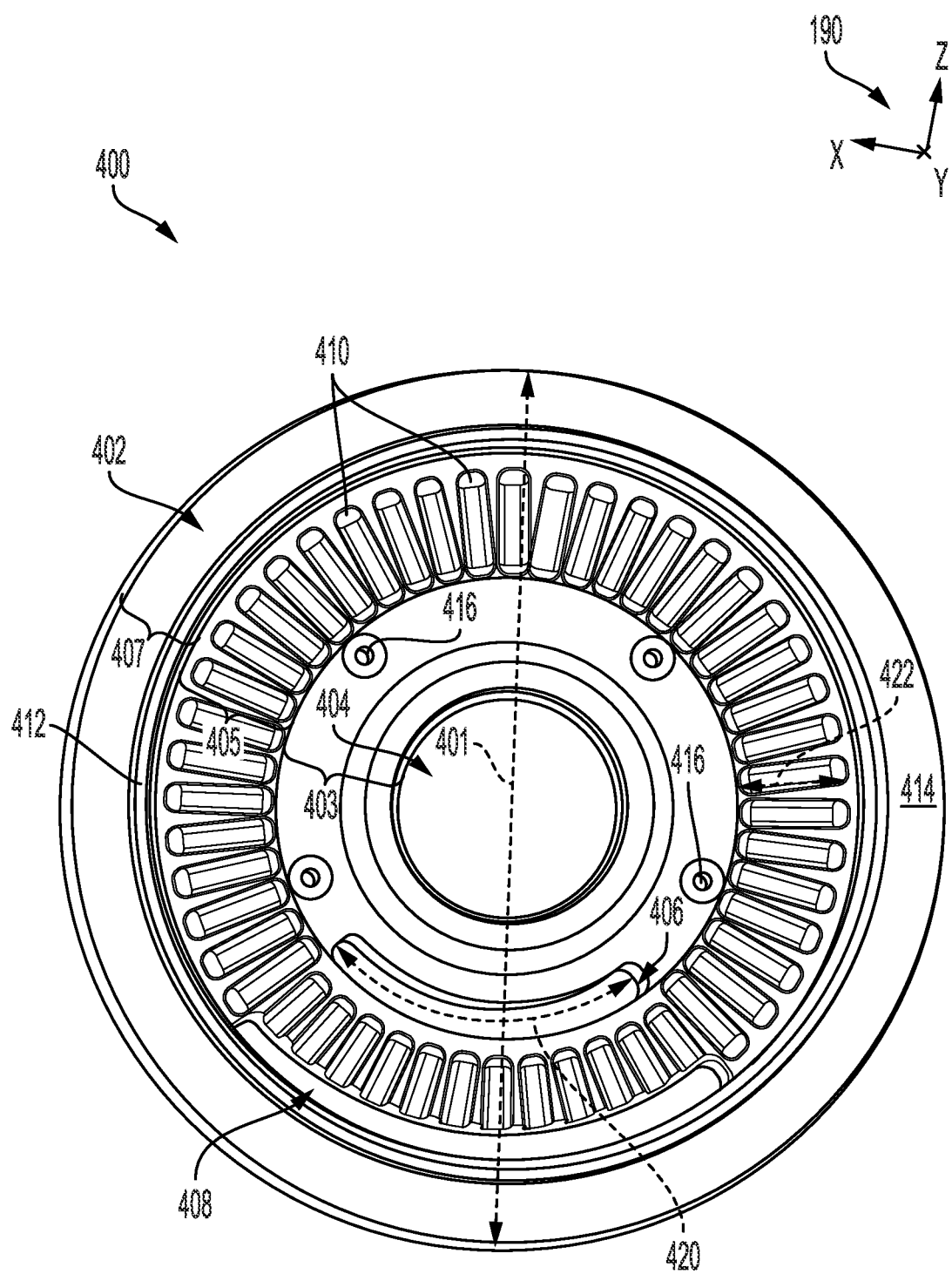
FIG. 4 shows an example of an end plate which may be coupled to the stator of FIG. 2.
Figure 5:
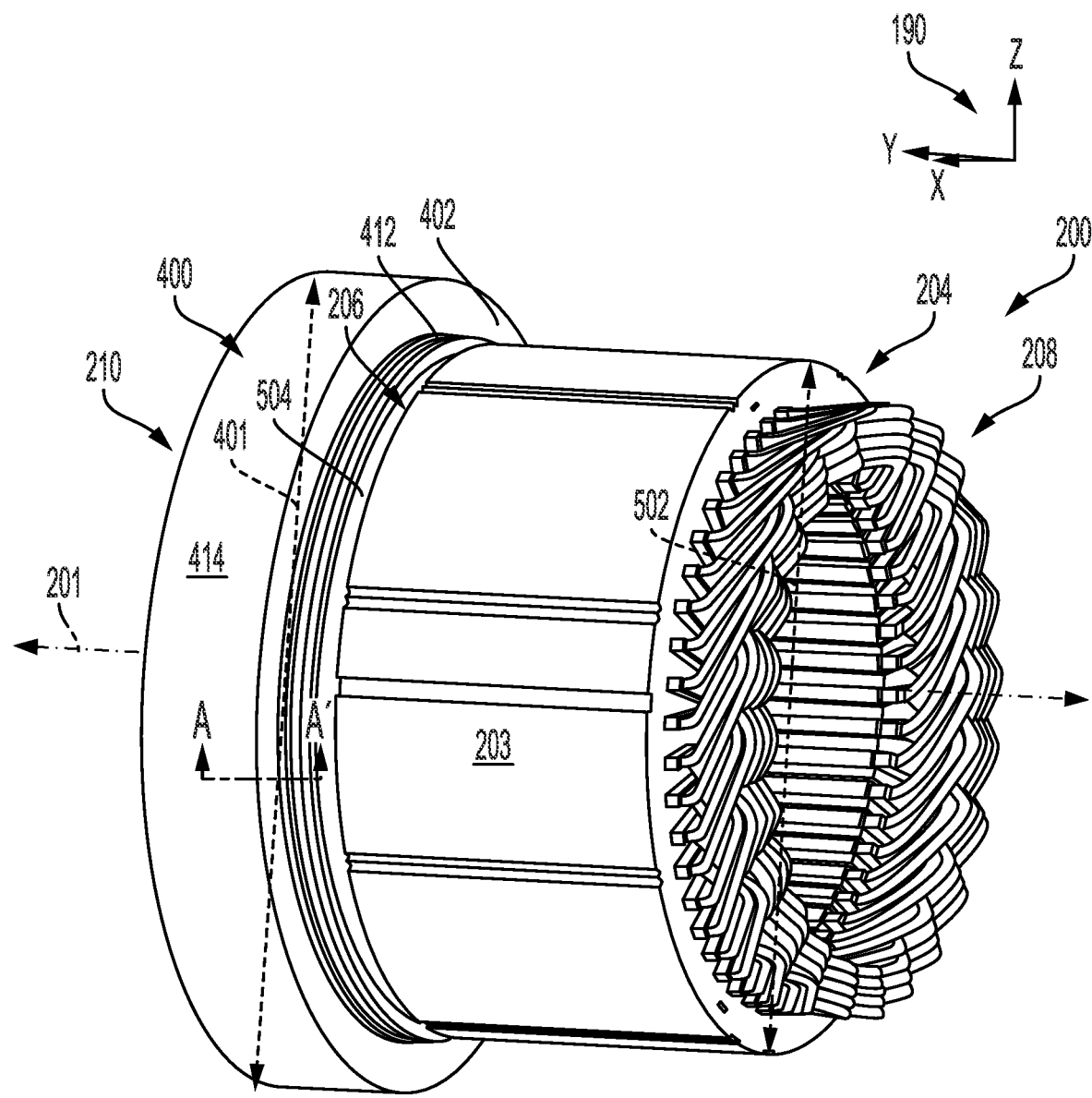
FIG. 5 shows the end plate of FIG. 4 coupled to the stator of FIG. 2.
Figure 6:
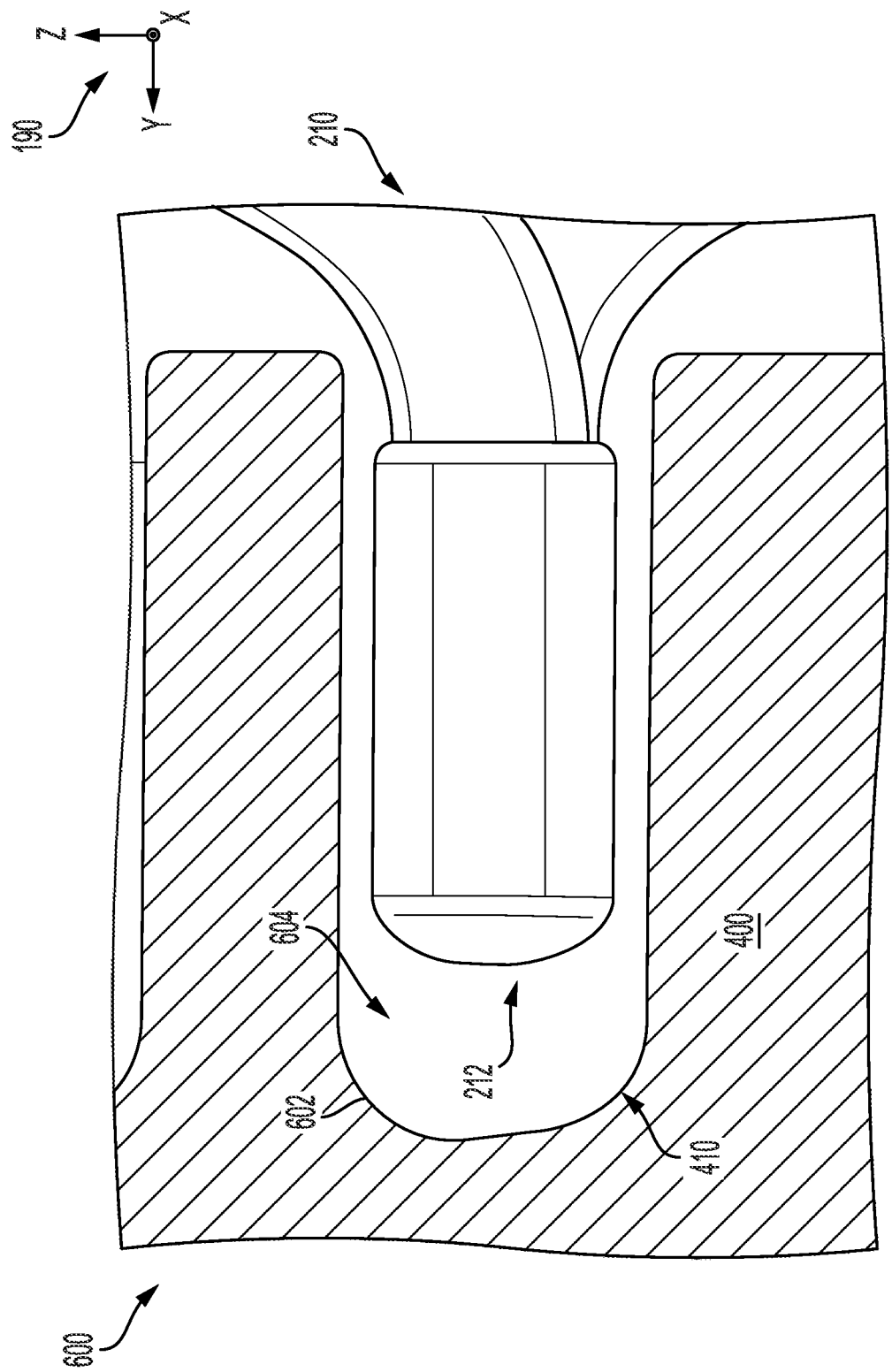
FIG. 6 shows a cross-sectional view of an indentation of the end plate.
Figure 7:
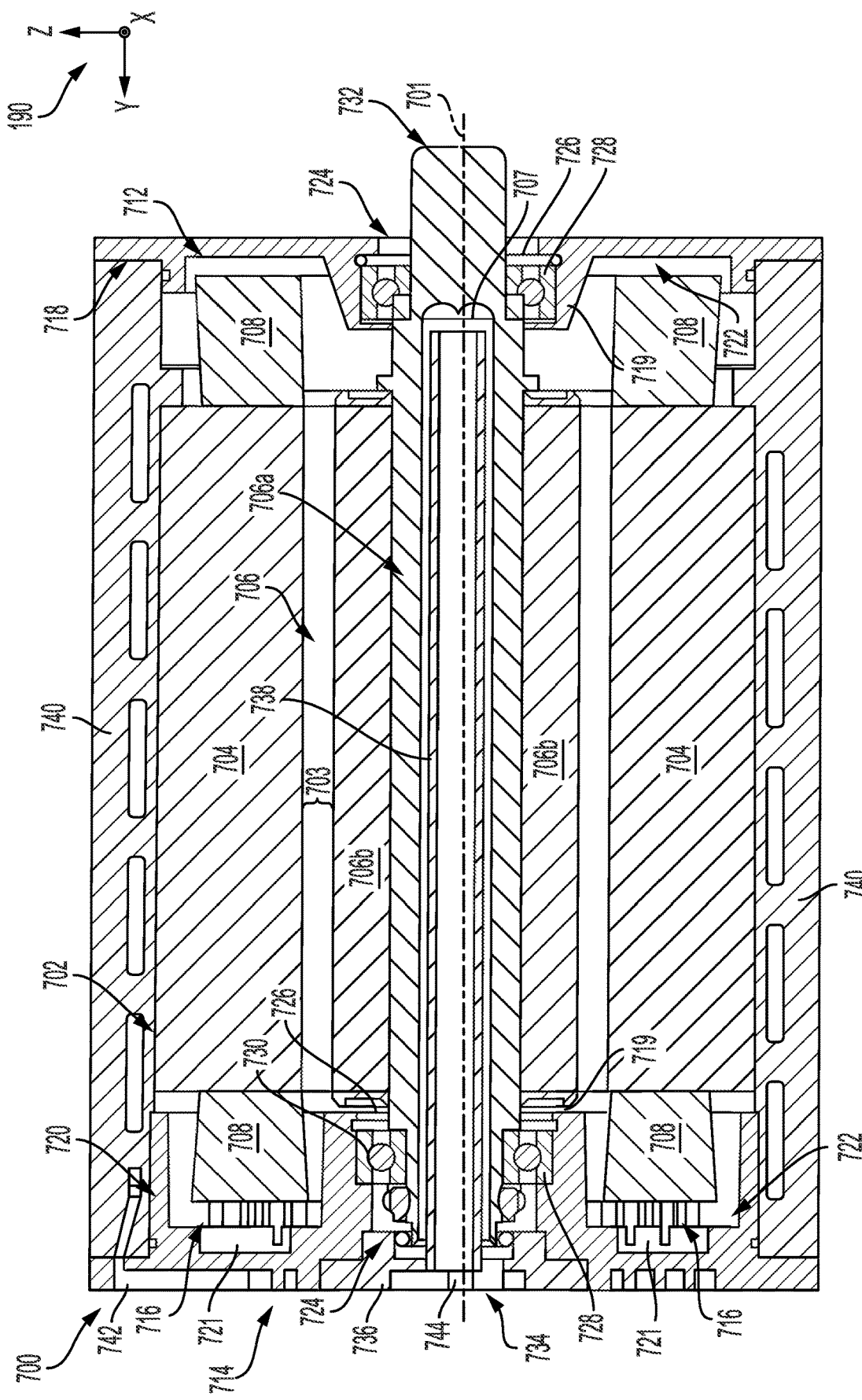
FIG. 7 shows a first example of an electric motor having at least one end plate for cooling and supporting end windings of the electric motor.
Figure 8:
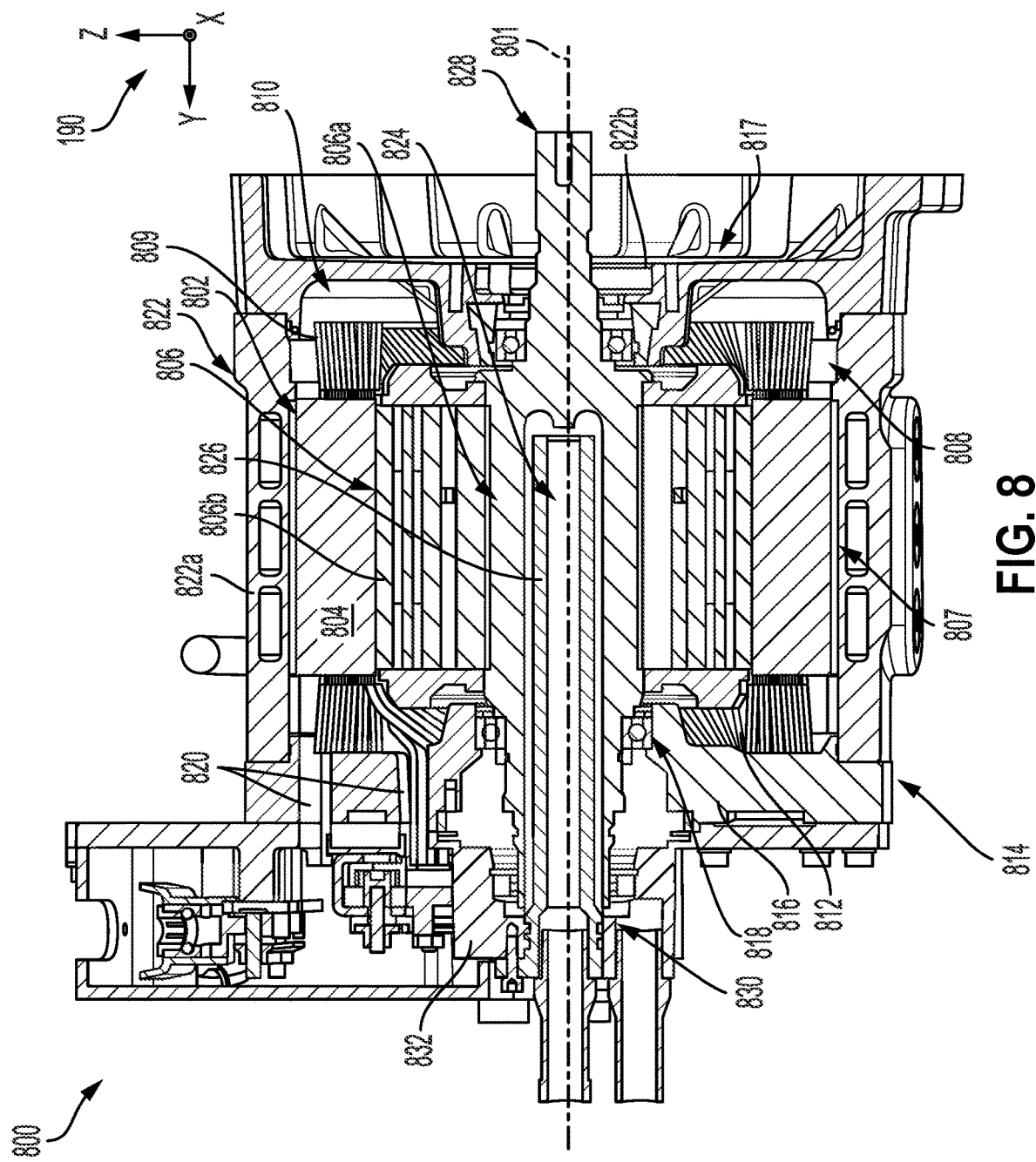
FIG. 8 shows a second example of an electric motor having at least one end plate for cooling and supporting end windings of the electric motor.

The following description relates to an electric motor with a radial flux stator configuration. An example of the electric motor, showing a general configuration of the electric motor, is depicted in FIG. 1. The electric motor may include end windings protruding from at least one end of the stator which may generate heat during operation of the electric motor that may not be readily dissipated by a cooling jacket circumferentially surrounding the stator. In one example, the stator may have hairpin conductive windings, as shown in FIG. 2, which includes welded tips at one end of the stator and U-shaped wires welded together at an opposite end of the stator. In other examples, the stator may instead have "I-shaped" end windings, which may include welded tips on both ends of the stator. To increase cooling of the end windings, the electric motor may be adapted with at least one end plate coupled to the cooling jacket. A schematic diagram of an electric motor with end plates coupled to opposite ends of a stator of the electric motor is shown in FIG. 3 and an example of an end plate configured with a plurality of indentations in an inner face of the end plate is illustrated in FIG. 4. The end plate of FIG. 4 may be coupled to the stator with hairpin conductive windings, as shown in FIG. 5, such that the end windings are recessed into the plurality of indentations, which may include a filler or potting material that interfaces with the end windings. For example, the plurality of indentations may be filled with the potting material to occupy spaces between surface of the indentations and the end windings. A positioning of the end windings within one of the plurality of indentations is depicted in FIG. 6 in a cross-sectional view. Example layouts of electric motors having one or more end plate for cooling end windings, seals, and bearings of the electric motors are illustrated in FIGS. 7 and 8. It will be appreciated that the end plate may be similarly coupled to end windings configured as welded tips and to end windings configured as U-shaped wires, such as those included in the hairpin conductive windings. For example, the indentations in the end plate coupled to U-shaped end windings may be shaped to receive the U-shaped end windings without directly contacting the end windings. Gaps within the indentations, between surfaces of the indentations and the end windings, may be similarly filled with the potting material.

FIGS. 2-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-8 are shown approximately to scale.

FIG. 1 shows a first end view 100 of an electric motor 10. The electric motor 10 includes a housing 102 that encloses internal components. In one example, the housing 102 may also be a cooling jacket with coolant channels disposed therein for flowing a coolant. A stator 104 including an end winding 106 may be enclosed within the housing 102. The end winding 106 may include a plurality of wound or hairpin wires (e.g., round wires, rectangular wires, flat wires, etc.) which are outside a core of the stator 104. The wound or hairpin wires may be connected to an input voltage source via a phase bus bar 113, with a coupling to the hairpin wires housed in the end winding 106 indicated by arrow 126. It will be appreciated that the stator core also includes wire sections which extend therethrough and may be integrated into, e.g., formed continuously with, the stator core.

The phase bus bar 113 may be coupled to a traction inverter 107 to deliver electrical energy to the stator 104 from an energy storage device 108 (e.g., battery, capacitor, and the like). In some cases, such as when the motor is configured with regeneration capabilities, the electric motor 10 may transfer electrical energy to the energy storage device 108. The traction inverter 107 may enable conversion of electrical power between AC and DC modes and may also adjust a speed of the electric motor 10 by varying a frequency of an alternating current. Arrow 109 denotes energy transfer between the electric motor 10 and the traction inverter 107 and arrow 110 denotes energy transfer between the traction inverter 107 and the energy storage device 108.

The electric motor 10 further includes a rotor 112 with a core 114 and a rotor shaft 116 rotating about rotational axis 118. It will be understood that a radial direction is any direction perpendicular to the rotational axis 118. Additionally, an axis system 190 including an x-axis, y-axis, and z-axis is also provided, for reference. The z-axis may be a vertical axis, the x-axis may be a lateral axis, and/or the y-axis may be a longitudinal axis, in one example, such that the rotational axis 118 may be parallel with the y-axis. However, the axes may have other orientations, in other examples. It will be appreciated that the electric motor 10 may be configured to generate rotational output in a first rotational direction and, in certain examples, a second rotational direction. Further, in some examples, the electric motor 10 may be designed to operate in a regeneration mode where the motor receives rotational input and generates electrical energy responsive to receiving the rotational input.

The rotor core 114 may include a plurality of metal laminations 115 (e.g., laminated magnetic steel or iron) or a solid magnetic metal. Thus, the rotor core 114 includes a magnetically interactive portion (e.g., permanent magnet or electromagnet). It will be appreciated that during motor operation, at least a portion of the rotor 112 may rotate while the stator 104 is held relatively stationary.

The stator 104 and the rotor 112 are configured to electrically interact to generate a rotational output and, in some cases, generate electrical energy responsive to receiving a rotational input from an external source such as a vehicle gear-train, in one use-case example. However, as mentioned above, the motor may be used in wide variety of operating environments. As such, the electric motor 10 is configured to generate rotational output and, in some examples, in a regeneration mode, receive rotational input and generate electrical energy output. Thus, the electric motor 10 may be designed to receive electrical energy from the energy storage device 108 and, in some examples, transfer energy to the energy storage device. Wired and/or wireless energy transfer mechanisms may be used to facilitate this energy transfer functionality.

A first balancing plate 120 is shown attached to the rotor core 114 at one end of the rotor core 114. A second balancing plate may be coupled to an opposite end of the rotor core 114. The first balancing plate 120 (and the second balancing plate) may be configured to account for imbalances in the rotor 112. To elaborate, the mass and mass distribution of the first balancing plate 120 and the second balancing plate, may be selected to counterbalance residual unbalanced forces in the motor. In other words, the balancing plates may provide cooling airflow dynamics, as well as substantial counterbalance functionality, in one example.

A liquid cooling system 122 configured to circulate a working fluid, such as a low viscosity coolant, through the electric motor 10 may be included therein. As shown, the liquid cooling system 122 may include fluid lines 124, which may be used by liquid cooling system 122 to circulate coolant throughout the electric motor 10. In one example, as described herein, the liquid cooling system 122 may be coupled to or included in a coolant circuit of a vehicle. The liquid cooling system 122 may therefore circulate a same coolant used to cool various vehicle components. The coolant may be an aqueous solution of a glycol, such as ethylene or propylene glycol and may also include additional constituents in less quantities, such as inorganic additives, organic acids, etc.

In one example, the coolant may be electrically conductive and may provide an electrical grounding path between a static part of the electric motor 10 and a rotating part of the electric motor 10. For example, the stationary part may be the stator 104 and the rotating part may be the rotor 112, or at least a portion of the rotor 112, including the rotor core 114 and the rotor shaft 116. The electrically conductive coolant may cool the static and rotating parts of the electric motor 10, as described further below, while enabling electrical continuity between the parts and an electrical ground. The electrical grounding enabled by the coolant may reduce pitting at the electric motor bearings or at a gearbox coupled to the electric motor 10 without relying on additional or costly, specialized components.

In other examples, the coolant may be oil. In yet another example, cooling provided by the liquid cooling system 122 may be combined with a direct oil cooling system used to cool the end winding 106 of the electric motor 10 in a hybrid cooling system. For example, the aqueous glycol-based coolant may be used to cool a water jacket of the electric motor 10 and portions of the end winding 106 cooled by an end plate (as described herein, not shown in FIG. 1). The portions of the end winding 106 cooled by the aqueous glycol-based coolant may be inserted into indentations of the end plate and surrounded by a potting material. The oil may be used to directly cool portions of the end windings not cooled by the aqueous glycol-based coolant.

The end plate may be included in the motor housing 102 to enclose the electric motor 10 and may be fluidically coupled to the water jacket, for example. As such, the coolant circulating through the water jacket may also flow through the end plate. The indentations of the end plate may be recesses or slots configured to receive the end winding 106 without directly contacting the end winding 106. Heat may be extracted from the end winding 106 into the coolant through the potting material located in the indentations. Further details of the end plate are provided below, with reference to FIGS. 2-8.

The electric motor 10 may be coupled to a control system 150 with a controller 152. The controller 152 includes a processor 154 (e.g., a microprocessor unit and/or other types of circuits) and memory 156 (e.g., random access memory, read only memory, keep alive memory, combinations thereof, etc.). The controller 152 may be configured to send control commands to system components 158 as well as receive signals from sensors 160 and other suitable components. The controllable components may include the electric motor 10 (e.g., the motor's stator). It will be understood that the controllable components may include actuators to enable the component adjustment. The sensors may include a motor temperature sensor 162, a rotor position sensor 164, etc. As such, the controller 152 may receive a signal indicative of the motor's speed and adjust the output of the motor based on the speed signal. The other controllable components in the electric motor may function in a similar manner. Furthermore, it will be understood that the controller 152 may send and receive signals via wired and/or wireless communication.

As described above, the electric motor may include hairpin conductive windings extending axially, e.g., along the rotational axis 118 of FIG. 1, through the stator and protruding from at least one end of the stator, when the stator has a radial flux configuration. An example of a radial flux stator 200 with hairpin winding 202, for an electric motor, is illustrated in FIG. 2. The stator 200 includes a stator core 203, which may be a cylindrical tube formed of a rigid, durable material, such as a metal, with a central opening 250 extending entirely through a length 205 of the stator core 203. A rotor, such as the rotor 112 of FIG. 1, may be inserted into the central opening 250 of the stator core 203.

The hairpin windings 202 may extend axially/longitudinally through the stator core 203, parallel with both a central axis of rotation 201 of the stator 200 (which may also be an axis of rotation of the electric motor) and with the y-axis, through the entire length 205 of the stator core 203. Furthermore, a length 207 of the hairpin windings 202 may be greater than the length 205 of the stator core 203, causing the hairpin windings 202 to protrude axially out of the stator core 203 at a first end 204 of the stator core 203 and at a second end 206 of the stator core 203. The hairpin windings may be coated wires with a metallic core, such as copper, covered with an insulating material, such as a varnish formed of a resin. Alternatively, the insulating material may be extruded on the metallic core and, in some examples, layers formed of different materials with different mechanical and electrical strengths may be used to form the insulating material.

At the first end 204 of the stator core 203, a protruding portion of the hairpin windings 202 may be a crown set of end windings 208. The crown set of end windings 208 may be formed of crown ends (e.g., continuous bends) of the hairpin windings 202. At the second end 206 of the stator core 203, a protruding portion of the hairpin windings 202 may be a welded set of end windings 210. The welded set of end windings 210 may be formed of terminal ends of the hairpin windings 202, where each hairpin winding, shaped as a hairpin, has two terminal ends protruding from the second end 206 of the stator core 203 along the same direction (e.g., along the positive y-axis). At least a portion of the terminal ends are welded to one another in pairs, forming welded tips 212 of the hairpin windings 202. The terminal ends may be welded via laser welding, in one example, or other welding methods. In other examples, the welded tips 212 may not be welded and instead soldered with, for example, silver.

The welded tips 212 may be arranged in radially-aligned columns, as indicated by dashed rectangles 209. Each of the radially-aligned columns may be aligned with a radial direction, e.g., a direction perpendicular to the central axis of rotation 201 along the x-z plane, and evenly spaced apart around a circumference of the stator core 203. The radially-aligned columns may include at least four of the welded tips 212, as shown in FIG. 2, but may include other quantities of the welded tips 212, in other examples.

The welded tips 212 may also be positioned along the x-z plane such that the welded tips 212 follow a continuous spiral path, with a first, inner ring of the welded tips 212 concentrically surrounded by a second ring of the welded tips 212, the second ring concentrically surrounded by a third ring of the welded tips 212, and the third ring concentrically surrounded by a fourth, outermost ring of the welded tips 212. A first end of the spiral path of the welded tips 212, positioned along the first, inner ring of the welded tips 212, may include a first set of unwelded terminal ends 214 of the hairpin windings 202. Additionally, a second end of the spiral path of the welded tips 212, positioned along the fourth, outermost ring of the welded tips 212 may include a second set of unwelded terminal ends 216 of the hairpin windings 202. While the stator 200 is depicted in FIG. 2 with four concentric rings of the spirally aligned welded tips 212, it will be appreciated that the stator 200 is a non-limiting example and other quantities of the hairpin windings 202, radially-aligned columns, and concentric rings, are possible without departing from the scope of the present disclosure. Furthermore, other examples, may include alternate orientations of the end windings, such non-spiraling paths, or alignment along directions other than radial directions.

The first and second sets of the unwelded terminal ends 214, 216, including portions stripped of the insulating material, may be directly coupled to phase bus bars, such as the phase bus bar 113 of FIG. 1. The welded set of end windings 210, excluding the first and second sets of the unwelded terminal ends 214, 216, however, may be free-standing structures that are unsupported mechanically in a conventional electric motor. Further, the welded set of end windings 210 may protrude from the second end 206 of the stator core 203 by a greater distance than a distance that the crown set of end windings 208 protrude from the first end 204 of the stator core 203 to accommodate welding of the welded tips 212. In other words, a length of the welded set of end windings 210 may be greater than a length of the crown set of end windings 208, the lengths defined along the central axis of rotation 201. The welded set of end windings 210 may therefore be prone to movement resulting from shocks and vibrations. Repeated exposure to the shocks and vibrations may lead to degradation of the insulating material coating the welded set of end windings 210. As well, thermal degradation may be pronounced at the welded set of end windings 210 (e.g., versus the crown set of end windings 208) due to the greater length of the welded set of end windings 210, which positions at least portions of the welded set of end windings 210 further away from a cooling jacket coupled to the electric motor.

Furthermore, while the radial flux stator offers benefits including efficient and facile fabrication, low cost (in comparison to axial flux stators, for example), and easier installation relative to other types of stators, and power density output of the radial flux stator is constrained by cooling of the stator and a geometry of the stator. In particular, the radial flux stator performance is dependent on management of heat generated by the stator. By reducing a temperature of the radial flux stator, an electrical resistivity of conductive materials, such as copper, may be reduced which suppresses losses generated during operation of the electric motor. For example, the stator may be cooled by a cooling jacket that circumferentially surrounds the stator along the axis of rotation, such as the housing 102 of FIG. 1. The cooling jacket may be liquid-cooled, flowing a coolant through coolant passages or channels in the jacket to draw heat from the stator to a heat sink, as an example.

The cooling jacket, however, does not cool the end windings of the stator or the rotor circumscribed by the stator. Heat generated at the end windings may be dissipated by conduction to portions of the stator core, e.g., extending through the stator, and conduction through the stator to the cooling jacket. An efficacy of heat dissipation from the end windings may be dependent on a thermal gradient between the end windings and the portions of the conductive windings in contact with the stator. The thermal gradient, however, may drive an amount of heat transfer that is less than heat transfer from the portions of the conductive windings extending through the stator, into the stator. As a result, hot spots may form at the end windings, and, in particular, at the welded set of end windings, due to their greater length relative to the crown set of end windings. In order to mitigate thermal degradation of the insulating material of the conductive windings and prolong a useful life of the stator, maintaining the hot spot temperatures below a threshold temperature, such as 150° C., 180° C., or a temperature therebetween, is demanded.

In addition, heat generation at the rotor of the electric motor may also affect the electric motor performance and condition. Losses resulting in heat generation at the rotor may be thermally isolated by a radial air gap between the rotor and the stator, resulting in heating of the rotor. Additionally, heat generated at the rotor may be transmitted to mechanical components such as bearings and shaft seals of the electric motor, which may experience further heating due to friction during operation of the electric motor. A localized rise in temperature may occur at the bearings and shaft seals which may adversely affect an integrity of the components. In some examples, replacement of the components with costly, heat-tolerant substitutes, or alterations to a configuration of the electric motor may be demanded.

In one example, as described herein, the issues described above may be at least partially addressed by providing a cooling jacket for a stator with at least one end plate configured as a heat sink to extract and dissipate heat from end windings of the stator. The end plate may include a slotted face with slots, or indentations, configured to receive end windings of the stator. The end plate may be further adapted with at least one cooling channel for flowing a coolant therethrough, the coolant drawing heat away from the end windings efficiently. The slots of the end plate may be filled with a thermally conductive filler, e.g., a potting material, that assists in conducting heat from the stator to the cooling jacket and provides mechanical support to the end windings, while accommodating thermal expansion of the end windings. The potting material may also be electrically insulating. In particular, the end plate may be coupled to the welded set of end windings when only one end plate of the electric motor is configured as described above, which may be desirable when maintaining a low size, weight, and cost of the electric motor is desired. A geometry and incorporation of the end plate in the electric motor may allow an overall axial length of the electric motor to be decreased.

An example of a radial flux electric motor 300 is depicted in FIG. 3 in a simplified schematic illustration of a cross-section of the electric motor 300. It will be noted that the cross-section depicts a portion of the electric motor 300, where the portion shown in the cross-section of represent half of the electric motor 300, e.g., a half of the electric motor 300 above a central axis of rotation 301 of the electric motor 300. It will be understood that the electric motor 300 includes various additional components that are omitted from FIG. 3 for clarity. The electric motor 300 includes a stator 303, including a stator core 302 with end windings 304 protruding axially (e.g., along the central axis of rotation 301) from either end of the stator core 302. In one example, the stator 303 may be similar to the stator 200 of FIG. 2 and the end windings 304 may be end windings of hairpin conductive windings. As such, the end windings 304 may include a crown set of end windings and a welded set of end windings. In other examples, the stator 303 may include various other types of conductive windings, such as other types of windings using round wires, including pulled-in windings (e.g., random windings), Litz wire windings, distributed or concentrated windings using round, rectangular, or Litz wires, etc. The end windings 304 may therefore be different from one another at either end of the stator core 302, such as when the conductive windings are the hairpin windings, or may be similar to one another when the conductive windings are of a different type, such as "I-shaped" windings.

The stator core 302 may circumferentially surround a rotor 306 of the electric motor 300 and may be spaced away from the rotor 306 by an air gap 308 (e.g., a radial air gap). The rotor 306 has a rotor core 310, which may include permanent magnets to generate magnetic flux fields and allow the rotor 306 to rotate at synchronous speeds in response to a supplied current. The rotor core 310 is coupled to a shaft 312 of the rotor 306 such that the rotor core 310 and the shaft 312 rotate as a single unit. In one example, a length of the shaft 312, as defined along the central axis of rotation 301, may be greater than a length of the rotor core 310, which may be similar to a length of the stator core 302. The rotor 306 may be formed of different materials depending on an application and a rotor sub-section. For example, the shaft 312 may be formed of steel or a similar metal able to transmit torque and having a desired stiffness. A core of the rotor 306 may be formed of a laminated ferrosilicon (FeSi) alloy stack with embedded permanent magnets, as an example. In one example, the permanent magnets may be neodymium iron boride.

The stator 303 and the rotor 306 may be enclosed within a housing 314 which may include a cooling jacket. The housing 314 includes a sleeve portion 316, a first end plate 318, and a second end plate 320, the sleeve portion 316 and the end plates described further below. The housing 314 may entirely surround the stator core 302 and may be formed of a rigid, thermally conductive material, such as aluminum, that is lightweight and low cost as well as mechanically strong and durable. By positioning the housing 314 in direct contact with the stator core 302, heat generated at the stator core 302 may be conducted away from the stator core 302 into the housing 314, as indicated by arrows 307. In some instances, the housing 314 may be air-cooled, transferring heat from the housing 314 to air flowing over the electric motor 300. In other examples, the housing 314 may be liquid-cooled, allowing heat to be exchanged at a coolant flowing through one or more coolant channels of the housing 314.

For example, the sleeve portion 316 of the housing 314 may circumferentially surround the stator core 302 along a direction parallel with the central axis of rotation 301. When the housing 314 is configured to be liquid-cooled, the sleeve portion 316 of the housing 314 may include at least one coolant channel fluidically coupled to a coolant circuit 309 of, for example, a vehicle, as indicated by arrows 305. Cooling of the stator 303 therefore does not demand a separate additional cooling system, such as an oil-based cooling system, that adds complexity and cost to implementation of the electric motor. The housing 314 may also include the first end plate 318 and the second end plate 320, the end plates arranged perpendicular to the central axis of rotation 301 and coupled to ends of the sleeve portion 316 of the housing 314. The end plates may be formed of a same or different material as the housing 314. In some examples, the end plates may be formed of aluminum to provide high thermal conductivity while maintaining a low weight of the end plates. The first end plate 318 has a central opening 322 (e.g., an opening centered about the central axis of rotation 301) to accommodate an arrangement of components coupled to the rotor 306, such as bearings, seals, etc. (not shown in FIG. 3).

Inner faces of the first and second end plates 318, 320 may receive the end windings 304 at respective ends of the electric motor 300. However, the end windings 304 may be spaced away from the inner faces of the end plates due to a slotted configuration of the inner faces, as described further below with reference to FIG. 4. For example, slots or indentations in the inner faces of the end plates may aligned with the end windings 304 such that tips of the end windings 304 may be inserted into the slots without contacting the end windings 304, and therefore without exerting any mechanical forces on the end windings 304. Spaces between the end plates and the end windings 304 within the slots may be filled with a flexible, thermally conductive potting material to provide mechanical support to the end windings 304 while enabling conductive transfer of heat from the end windings 304 to the end plates.

The first and second end plates 318, 320 may, in one example, be coupled to the sleeve portion 316 of the housing 314 such that the end plates and the housing 314 form a single, continuous unit. Alternatively, the end plates may be separate units from the sleeve portion 316 and may be attached to the sleeve portion 316 by welding, fasteners, etc. The end plates may allow heat to be dissipated from the end windings 304 by conducting heat from the end windings 304 to the sleeve portion 316 of the housing 314, as indicated by arrows 307. In comparison to heat dissipation through the rotor core to the housing 314, heat transfer across the end plates provides additional thermal transfer paths for heat generated at the end winding 304. Heat management of the end windings may be faster and more efficient, due to a high thermal conductivity of the end plate material.

In some examples, the end plates each include at least one coolant channel fluidically coupled to the at least one coolant channel of the sleeve portion 316, as indicated by arrows 305, enabling coolant from the coolant circuit 309 to be circulated to the end plates, thereby increasing a cooling capacity of the end plates. In yet other examples, only one of the end plates may have the at least one coolant channel and the other end plate may not include coolant channels. In particular, the end plate coupled to the welded set of end windings (e.g., the welded set of end windings 210 of FIG. 2) may be configured with at least one coolant channel due to a tendency for hot spots to be generated at the welded set of end windings. The hot spots may form as a result of a greater length of the welded set of end windings compared to the crown set of end windings, when the conductive windings are the hairpin windings.

By configuring the housing 314 with the first and second end plates 318, 320, each configured to receive the end windings 304 of the stator 303, an additional heat flux path is provided for the stator 303. For example, without the configuration of the end plates as described herein, heat generated at the end windings 304 may instead be conducted to the stator core 302 at the ends of the stator core 302, and through the stator core 302 to the sleeve portion 316 of the housing 314. This may increase a cooling burden of the sleeve portion 316, thereby decreasing a cooling efficiency of the housing 314. With the end plates coupled to the sleeve portion 316 of the housing 314, the heat from the end windings 304 may instead be conducted away from the stator core 302, increasing overall heat dissipation from the stator 303.

In some instances, the rotor 306 may also be configured to flow the coolant therethrough when the housing 314 is liquid-cooled. For example, as shown in FIG. 3, the shaft 312 of the rotor 306 may include a coolant channel 324 extending along a portion of the length of the shaft 312. The coolant channel 324 may be disposed in a portion of the rotor 306 that remains stationary and does not rotate. The coolant channel 324 may be coupled to the at least one coolant channel of one of the end plates such that the coolant is delivered to the coolant channel 324 from the end plate. In this way, coolant may be circulated from the coolant circuit 309 of the vehicle, to the sleeve portion 316 of the housing 314, into one or more of the first and second end plates 318, 320, and into the shaft 312 of the rotor 306 before flowing back to a heat sink of the coolant circuit 309, such as a heat exchanger. Heat extraction via coolant flow at the end plates and the rotor shaft allows temperatures of the end windings, the rotor, as well as bearings and seals coupled to the rotor, to be maintained below a temperature threshold, such as 100° C., as an example. Furthermore, by fluidically coupling the coolant channel 324 to the coolant channel of one of the end plates, a temperature differential formed between any rotating component of the electric motor and a stationary component is maintained small. A useful life of the various electric motor components is thereby prolonged.

In order to maximize cooling of the end windings by the end plates, it may be desirable to position the end windings as close as possible to the end plates while providing sufficient clearance to accommodate thermal expansion of the end windings. This may be achieved by configuring inner faces of the end plates, e.g., faces of the end plates facing the end windings, with slots or indentations for receiving the end windings. For example, tips of the welded set of end windings may be at least partially recessed into the indentations, thereby decreasing an amount of extra length added to the electric motor due to a capping of the stator by the end plates at either end.

An example of an inner face 402 of an end plate 400 for a housing of an electric motor is depicted in FIG. 4 and the end plate 400 is shown in FIG. 5 coupled to the stator 200 of FIG. 2. The end plate 400 may be an exemplary embodiment of either of the first end plate 318 or the second end plate 320 of FIG. 3, and as illustrated in FIG. 5, may be coupled to the welded set of end windings 210 of the stator 200. However, in some examples, a similarly configured end plate may be coupled to the crown set of end windings 208 of the stator 200. Furthermore, an outer face of the end plate 400, e.g., a face of the end plate opposite of the inner face 402, may be smooth and uniform, as one example. In other examples, the outer face may include a cooling channel and/or electrical connections.

The end plate 400 has a circular outer geometry with a diameter 401 that is greater than an outer diameter 502 of the stator 200, as shown in FIG. 5. In some examples, the outer diameter 502 of the stator 200 may correspond to an inner diameter of a sleeve portion of a cooling jacket, such as the sleeve portion 316 of the housing 314. The sleeve portion 316 may extend axially to circumferentially surround the end plate 400, e.g., the end plate 400 is positioned inside of the sleeve portion of the cooling jacket. In other examples, the end plate 400 may be positioned outside of and abutting ends of the sleeve portion, as shown in FIG. 3.

The inner face 402 of the end plate 400, as shown in FIG. 4, may include a central opening 404 that is also circular, as well as a first slotted through-hole 406 and a second slotted through-hole 408. The end plate 400 also has a plurality of indentations 410, with a portion of the plurality of indentations 410 arranged between the first slotted through-hole 406 and the second slotted through-hole 408, a rim 412 protruding outwards from the inner face 402 along the y-axis, as shown in FIG. 5, and an outer border 414 encircling the rim 412. As illustrated in FIG. 5, the rim 412 may have an outer diameter that is similar to the outer diameter 502 of the stator 200 while the diameter 401 of the outer border 414 (also the overall diameter of the end plate 400) is greater than the outer diameter 502 of the stator 200.

As shown in FIG. 4, the inner face 402 may have three concentric portions: a first concentric portion 403 proximate to the central opening 404, a second concentric portion 405 circumferentially surrounding the first concentric portion 403, and a third concentric portion 407 circumferentially surrounding the second concentric portion 405 and forming an outermost portion of the inner face 402. The first concentric portion 403 includes the first slotted through-hole 406 and fastener holes 416. The fastener holes 416 may be configured to receive fasteners for securing a position of the end plate 400 relative to the stator 200 and may be aligned proximate to and inside of an outermost boundary of the first concentric portion 403 of the inner face 402. In some examples, the end plate 400 may further include dowel pins and pilot holes for aligning the end plate 400 with the stator 200 and with the sleeve portion of the cooling jacket. However, in other examples, the fastener holes 416, dowel pins, and pilot holes may be omitted.

The first slotted through-hole 406 may extend entirely through a thickness (as defined along the y-axis) of the end plate 400 and may be shaped as a curved oblong slot with a length 420 of the first slotted through-hole 406 extending along a portion of a circumference of the first concentric portion 403 of the inner face 402. The first slotted through-hole 406 may also be aligned proximate to and inside of the outermost boundary of the first concentric portion 403 such that the first slotted through-hole 406 may be aligned with the first set of unwelded terminal ends 214 of FIG. 2 along the central axis of rotation 201 (as shown in FIG. 5). The first set of unwelded terminal ends 214 may therefore extend through the end plate 400, unimpeded, to couple to a phase bus bar, as described above. Similarly, the second set of unwelded terminal ends 214 of FIG. 2 may extend through the second slotted through-hole 408 of the end plate 400. The second slotted through-hole 408 may have a greater length than the length 420 of the first slotted through-hole 406 and may be aligned with the second set of unwelded terminal ends to allow the second set of unwelded terminal ends to also couple to a phase bus bar.

Although the unwelded tips are depicted having greater axial lengths, e.g., along the central axis of rotation 201 in FIG. 2, than the welded set of end windings (e.g., the welded set of end windings 210 of FIG. 2), in other examples, the unwelded tips may have axial lengths similar to the welded set of end windings. In other words, the unwelded tips may be shorter than shown in FIG. 2 and the phase bus bars may be located closer, along the central axis of rotation, to the stator core (e.g., the stator core 203 of FIG. 2). The phase bus bars may include extensions that couple to at least some of the unwelded tips, similar to welded pairs of the welded set of end windings. The unwelded tips may be thereby cooled by the end plate 400 in a similar manner as the welded set of end windings. The phase bus bar may be routed radially through the cooling jacket of the electric motor to enable connection of the phases outside of the electric motor.

The second concentric portion 405 of the inner face 402 of the end plate 400, which may align with the end windings protruding from the stator core 203 along the central axis of rotation 201, includes the plurality of indentations 410. The plurality of indentations 410 may each be shaped as an oblong recess in a surface of the inner face 402 with a length 422 of each of the plurality of indentations 410 aligned with a radial direction (e.g., perpendicular to the central axis of rotation 201, and extending outwards and away from a center of the end plate 400 and from the central axis of rotation 201 along the x-z plane). The length 422 of the plurality of indentations may extend across most of a distance between an inner boundary and an outer boundary of the second concentric portion 405. At the portion of the plurality of indentations 410 located between the first slotted through-hole 406 and the second slotted through-hole 408, the plurality of indentations 410 may be interrupted by the first slotted through-hole 406, and the length of the plurality of indentations 410 may be reduced.

The plurality of indentations 410 may be evenly spaced apart from one another around a circumference of the second concentric portion 405 of the inner face 402. A depth of the plurality of indentations 410, e.g., as defined along the y-axis, may extend into a portion of the thickness of the end plate 400, but not entirely through the thickness. For example, the depth of the plurality of indentations 410 may extend up to 50% of the thickness of the end plate 400, or between 30%-70% of the thickness of the end plate 400. In yet other examples, the plurality of indentations 410 may instead be configured as through-holes extending entirely through the thickness of the end plate 400. In such examples, temporary plugs may be demanded during filling of the through-holes with a potting material, the potting material described below. By extending the plurality of indentations 410 through the entire thickness of the end plate 400, the end windings may be cooled while allowing the unwelded tips of the end windings to be coupled to the phase bus bars as indicated by the unwelded tips shown in FIG. 2 and the corresponding slotted through-holes of the end plate 400. Surfaces of the plurality of indentations 410 may be smooth and curved, e.g., without any sharp angles or edges, as shown in FIG. 6 and described further below.

Each of the plurality of indentations 410 may be aligned with a radially-aligned column of welded tips, such as the radially-aligned columns of the welded tips 212 indicated by the dashed rectangles 209 of FIG. 2. In other examples, however, the plurality of indentations 410 may not have the oblong geometry shown in FIG. 4 and may instead be formed as individual pockets, each individual pocket corresponding to one of the welded tips and shaped to receive the welded tip as described herein. The welded tips may be inserted into each of the plurality of indentations 410 without directly contacting surfaces of the inner face 402 of the end plate 400, including the surfaces of the plurality of indentations 410 and surfaces between the plurality of indentations 410 along the inner face 402. In this way, each radially-aligned column of welded tips may be nested within one of the plurality of indentations 410. As such, as portion of a length of the end windings (the end windings that include the welded tips) may be recessed into the plurality of indentations 410.

The third concentric portion 407 of the inner face 402 includes the rim 412 and the outer border 414. The rim 412 may be positioned proximate to but not directly in contact with the second end 206 of the stator 200, as shown in FIG. 5, and may include a plurality of ridges along an outer surface of the rim 412. A gasket 504 may be arranged between the rim 412 and the second end 206 of the stator 200, the gasket 504 configured to be compressed between the rim 412 and the second end 206 when the end plate 400 is coupled to the stator 200 (e.g., by fasteners).

In another example, as shown in FIG. 8, the end plate may be spaced away from the stator core such that the end plate does not contact the stator core, and components for providing sealing therebetween are precluded. The stator and the end plate may be maintained in place mechanically via a positioning of a heatsink (e.g., a cooling jacket 822 of FIG. 8).

As described above, the end plate 400 may be adapted with at least one internal coolant channel or passage to flow coolant therethrough. The end plate 400 may therefore also include ports or outlets (not shown in FIGS. 4 and 5) for receiving the coolant from the sleeve portion of the housing and, optionally, for delivering the coolant to a rotor of the electric motor. The coolant channel may enable the coolant to flow sufficiently close to the plurality of indentations 410 to draw heat from the welded tips of the end windings, through a thermally conductive filler occupying a space between surfaces of the plurality of indentations and the welded tips of the end windings, and through a material of the end plate 400, to the coolant. In one example, the at least one coolant channel may wind between the plurality of indentations 410, similar to a pin fin power transistor module, although other configurations have been contemplated.

In other examples, the end plate 400 may instead be a solid plate, e.g., without an internal coolant channel, formed of a thermally conductive material, such as aluminum. The material of the end plate 400 may conduct heat from the end windings to the sleeve portion of the housing through which coolant may flow. The end plate 400 may thereby increase cooling of the end windings via direct contact with the sleeve portion of the housing, and without relying on coolant.

The nesting of the welded tips of the end windings within the plurality of indentations 410 of the end plate 400 allows the welded tips to be cooled and mechanically supported without abutting the surfaces of the plurality of indentations 410 when the end windings rise in temperature and expand. A cross-section 600 is shown in FIG. 6 illustrating a positioning of the welded tips 212 of the welded set of end windings 210 of FIG. 2 within one of the plurality of indentations 410 of FIG. 4, the cross-section 600 taken along line A-A' of FIG. 5 (e.g., along the y-z plane).

The welded tips 212 may be included in one of the radially-aligned columns of the welded tips 212 (e.g., as shown in FIG. 2) and may be inserted entirely into the one of the plurality of indentations 410 (hereafter, the indentation 410) without directly contacting a surface 602 of the indentation 410. By providing a space 604 between the surface 602 of the indentation 410 and the welded tips 212, expansion of the welded tips 212 as well as manufacturing tolerance, e.g., variations in dimensions of the welded tips 212, may be accommodated. As described above, the surface 602 may be smooth, continuous, and curved. In the space 604 between the surface 602 of the indentation 410 and the welded tips 212, a potting material may be arranged therein which may interface with both the welded tips 212 and the surface 602.

The potting material may be a thermally conductive encapsulation compound, such as a silicone encapsulant, that is also mechanically flexible. It will be noted that a variety of thermally conductive and electrically insulating fillers may be used as the potting material. A flexibility of the potting material may allow the welded tips 212 to expand during operation of the electric motor without encountering resistance that causes warping and bending of the welded tips 212. The potting material may at least partially absorb shocks and vibrations, thereby reducing transfer of such motion to the end windings. The potting material therefore has multiple roles, including efficiently conducting heat from the end windings to the coolant, providing mechanical support to the end windings, and decreasing random motion of the end windings. By placing the potting material only in the spaces between the surfaces of the indentations and the end windings, an additional weight of the potting material is minimized compared to conventional strategies for end winding encapsulation. In some instances, the potting material may also be used to fill in other spaces in the electric motor around the end windings to replace air and to provide additional thermally conductive paths as well as additional mechanical support. Furthermore, the potting material may be used to fill in spaces in static regions of the electric motor (e.g., areas that are not at/around the rotor). As one example, the stator may be adapted with an optional additional sleeve within its inner diameter and the potting material may be used to fill in gaps around the additional sleeve.

Furthermore, in some examples, a thin layer of an electrically insulating material, such as a powder coating, may be applied to the inner face of the end plate and/or on the conductive windings to electrically insulate the stator. In one example, the powder coating may be an epoxy powder coating. Additionally, an insulating coating or varnish on the end windings may be removed at certain regions of the end windings, such as at regions where wires of the end windings are spaced sufficiently far apart to minimize contact therebetween. This may decrease thermal resistance while the electrically insulating material may maintain electrical insulation.

The end plates of the housing of the electric motor may therefore provide multiple advantages. As one example, a cooling capacity of the end plates may further assist in cooling a shaft mechanically coupling the electric motor to a gearbox, thereby increasing heat dissipation at the gearbox. The end plates may also mechanically support the end windings without adding burdensome length to the electric motor and enable more uniform cooling of the stator and rotor.

The more uniform cooling may reduce hot spot temperatures in the end windings, drawing down a temperature of the hot spots to be more similar to an overall temperature of the end windings during electric motor operation. As a result, a useful lifetime of insulating material in the electric motor may be prolonged.

The cooling provided by the end plates may also increase cooling of bearings and seals coupled to the rotor. As an example, a first embodiment of an electric motor 700 having at least one endplate configured to cool end windings of a stator, as described herein, is depicted in FIG. 7 in a cross-sectional view of the electric motor 700. The electric motor 700 may correspond to the electric motor 10 of FIG. 1 or the electric motor 300 of FIG. 3, for example. It will be appreciated that the electric motor 700 is a non-limiting example of a positioning and arrangement of components in an electric motor, and other examples may include variations in orientation, dimensions, and location of the components. As well, other examples may have more or less components than those shown in FIG. 7. The electric motor 700 includes a stator 702 which may be similar to the stator 200 of FIGS. 2 and 5, having a stator core 704 surrounding a rotor 706. The electric motor 700 may be used in a vehicle to drive rotation of an axle shaft coupled to drive wheels of the vehicle, for operating as a starter motor during engine startup, and/or for electrical power generation, for example.

The stator 702 is depicted with blocks 708 protruding axially, e.g., along a central axis of rotation 701 of the electric motor 700, from either end of the stator core 704. The blocks 708 may be a simplified representative of a geometric envelope of end windings of the stator 702. For example, at a first end 712 of the stator 702, a crown set of end windings (such as the crown set of end windings of FIG. 2) is indicated by the corresponding blocks 708. At a second, opposite end 714 of the stator 702, a welded set of end windings 716 includes the corresponding blocks 708 as well as welded tips protruding from the blocks 708 along the central axis of rotation 701.

A first end plate 718 may be coupled to the first end 712 of the stator 702 and a second end plate 720 may be coupled to the second end 714 of the stator 702. Inner surfaces 719, e.g., faces of the end plates proximate to the end windings (as indicated by the blocks 708), may be contoured to accommodate a profile of the stator 702 along the x-z plane. For example, the inner surfaces 719 may include grooves 722 to maintain the end plates spaced away from the end windings at the first end 712 of the stator 702 and from the welded set of end windings 716 at the second end 714 of the stator 702. The grooves 722 of the inner surfaces 719 of the first and second end plates 718, 720 may also include a plurality of indentations 721, similar to the plurality of indentations 410 of FIGS. 4 and 6, into which the welded set of end windings 716 may be inserted. As described above, the plurality of indentations 721 may be filled with a potting material.

The first and second end plates 718, 720 may each include a central opening 724 to allow extension of a shaft 706a of the rotor 706 (e.g., a rotor shaft 706a) therethrough. At the central opening 724 of each end plate, a seal 726 and a bearing 728 may be disposed between the rotor 706 and the inner surfaces of the central opening 724 of each end plate. The seal 726 and the bearing 728 may each circumferentially surround the rotor shaft 706a, in contact with both the rotor shaft 706a and the end plates. The seal 726 may be a disc formed of a flexible material, such as rubber, silicone, etc., and may form sealing interfaces with each of the end plates and the rotor shaft 706a. As such air and fluid outside of the electric motor 700 may not exchange with air and fluid inside of the electric motor 700, due to the sealing interfaces formed by the seal 726.

The bearing 728 may have a toroidal geometry and, as shown in FIG. 7, may be a ball bearing having a plurality of embedded balls 730. The bearing 728 may stabilize a position of the rotor 706 within the stator core 704, e.g., centered along the central axis of rotation 701 with the rotor core 706b spaced away from inner surfaces of the stator core 704 by an air gap 703, while enabling rotation of the rotor 706 with reduced friction. As one example, the bearing 728 may be formed of a metal, such as stainless steel.

The rotor 706 may also include a rotor core 706b circumferentially surrounding and fixedly coupled to the rotor shaft 706a. The rotor core 706b may be a cylindrical tube, arranged parallel with and centered about the central axis of rotation 701, that has a length, as defined along the central axis of rotation 701, similar to a length of the stator core 704 and shorter than a length of the rotor core 706b. The rotor core 706b may include, depending on the rotor type, various magnetic components, such as electromagnets, permanent magnets, conductive windings, etc.

The length of the rotor shaft 706a results in protrusion of the rotor shaft 706a out through the central opening 724 of the first end plate 718 at a first end 732 of the stator 702. At a second, opposite end 734 of the rotor 706, the rotor shaft 706a may be flush with an outer surface of the second end plate 720 (the outer surface opposite of the inner surface 719). A cap 736 may be fitted over the central opening 724 of the second end plate 720, in contact with the rotor shaft 706a at the second end 734 of the rotor 706. The rotor shaft 706a may also enclose an inner tube 738 within an inner cavity 707 of the rotor shaft 706a, the inner tube 738 extending along a portion of the length of the rotor shaft 706a between the cap 736 and the first end plate 718. The inner tube 738 may be static, e.g., the inner tube 738 does not rotate around the central axis of rotation 701, and may have an inner passage extending along an entire length of the inner tube 738.

During operation, the electric motor 700 may rise in temperature due to losses within the conductive windings, at the end windings, at magnets of the rotor 706, etc. In order to control a temperature of the electric motor 700, a cooling system may be coupled to the electric motor 700. The cooling system may include a cooling jacket 740, which may be a liquid-cooled housing, for example, arranged circumferentially around the stator 702. The cooling jacket 740 may include various inner passages for flowing coolant therethrough and may be connected to a coolant circuit of a vehicle by a port. Heat may be conducted through a material of the cooling jacket 740 from the stator core 704 to the coolant, thereby reducing a temperature of the stator core 704, as well as of the conductive windings extending through the stator core 704.

The cooling system of the electric motor 700 may also include cooling channels disposed in at least the second end plate 720, and, in some examples, in the first end plate 718 as well. For example, as shown in FIG. 7, the second end plate 720 has a cooling channel 742 that is fluidically coupled to the cooling jacket 740. Coolant may be exchanged between the cooling jacket 740 and the cooling channel 742, thereby fluidically coupling the cooling channel 742 to the coolant circuit of the vehicle. In this way, coolant circulating through the cooling system of the electric motor 700 may be continuously refreshed and replaced, allowing a cooling capacity of the coolant to remain consistent.

By configuring one or more of the end plates with at least one cooling channel, e.g., the cooling channel 742, coolant may directly extract heat from the end windings, via heat conduction through the potting material in contact with the end windings, and through a material of the end plates. Furthermore, the coolant flowing through at least one of the end plates may draw heat away from the bearing 728 and the seal 726 of the respective end plate. The bearing 728 and the seal 726 may be prone to localized heating due to friction losses during operation of the electric motor 700, which cause degradation of the bearing 728 and the seal 726 over time. Heat dissipation driven by coolant flow in at least one of the end plates may therefore prolong a useful life of the bearing 728 and the seal 726.

Additionally, the cooling channel 742 may be fluidically coupled to the inner passage of the inner tube 738 of the rotor shaft 706a through a port 744 in the cap 736 at the second end 734 of the rotor 706. The inner tube 738 may therefore also be included in the cooling system of the electric motor 700. Coolant may be delivered to the inner tube 738 of the rotor shaft 706a from the second end plate 720, enabling direct cooling of the rotor 706. In this way, the stator core 704, the end windings of the stator 702, the rotor 706, one or more of the bearing 728, and one or more of the seal 726 of the electric motor 700 may be effectively cooled during operation. As such, the electric motor 700 is cooled by a continuous cooling system that flows coolant through the cooling jacket, the end plates, and the rotor continuously. The continuous cooling system may simplify a cooling circuit of the cooling system by incorporating only two coolant inlets and two coolant outlets for circulating coolant.

A second embodiment of an electric motor 800 is illustrated in FIG. 8. The electric motor 800 may correspond to the electric motor 10 of FIG. 1, and may include a stator 802 similarly configured to the stator 200 of FIGS. 2 and 5, having a stator core 804 surrounding a rotor 806. It will be appreciated that the electric motor 800 is a non-limiting example of an electric motor that may include end plates for encapsulating and cooling end windings of a stator, as described herein. The stator 802 includes hairpin conductive windings 808 with a crown set of end windings 809 protruding along a central axis of rotation 801 of the electric motor 800 at a first end 810 of the stator 802, from the stator core 804. A welded set of end windings 812 protrudes, also along the central axis of rotation 801, from the stator core 804 at a second, opposite end 814 of the stator 802.

The electric motor 800 of FIG. 8 may share components and an overall layout in common with the electric motor 700 of FIG. 7. The electric motor 700 of FIG. 7, however, may be more compact, e.g., an axial length of the electric motor 700 is shorter than that of the electric motor 800. Additionally, the electric motor 700 has both end plates adapted with cooling channels, while the electric motor 800 has one cooling end plate and one conventional end plate (e.g., an end plate not adapted with coolant channels or indentations filled with potting material). Components of the electric motor 700 may be cooled by a continuous cooling system whereas the electric motor 800 may be cooled by a cooling system with discrete sections.

The electric motor 800 depicted in FIG. 8 may have one cooling end plate 816 arranged proximate to the second end 814 of the stator 802 and one conventional, non-cooling end plate 817 (hereafter, front plate 817) arranged proximate to the first end 810 of the stator 802, where "cooling" refers to implementation of at least one coolant channel in the end plate. Similar to the first and second end plates 718, 720 of FIG. 7, the cooling end plate 816 may include various grooves and contours along an inner face of the cooling end plate 816 to accommodate profiles of the stator core 804 and of the welded set of end windings 812. The cooling end plate 816 may also include a plurality of indentations, such as the plurality of indentations 410 of FIGS. 4 and 6, into which the welded set of end windings 812 may be inserted. The plurality of indentations may be filled with a potting material that provides mechanical support to the welded set of end windings 812 and conducts heat from the welded set of end windings 812 to the cooling end plate 816.

The cooling end plate 816 has a central opening 818 through which the rotor 806 extends. The cooling end plate 816 may also include slots 820 which extend entirely through a thickness of the cooling end plate 816 (the thickness defined along the central axis of rotation 801). The slots 820 may allow unwelded tips of the welded set of end windings 812 (e.g., similar to the unwelded sets of terminal ends 214, 216 of FIG. 2) to be coupled to phase busbars, as well as various cables and connectors, to be passed through the cooling end plate 816 and connected to the stator 802. At the first end 810 of the stator 802, the stator 802 may be coupled to a cooling jacket 822 of the electric motor 800.

The cooling jacket 822 may be a housing with a first portion 822a circumferentially surrounding the stator 802 along the central axis of rotation 801, and a second portion 822b forming a surface perpendicular to the central axis of rotation 801. The front plate 817 may be coupled to the second portion 822b of the cooling jacket 822 where the front plate 817 may be secured to the second portion 822b to allow the front plate 817 to cover the first end 810 of the stator 802. The first portion 822a may be continuous with the second portion 822b, forming a single, continuous structure separate from the front plate 817. However, in other examples, the front plate 817 may be continuous with the cooling jacket 822. The cooling jacket 822 may include various inner channels for coolant flow and may be fluidically coupled to a coolant circuit of a vehicle by ports, external tubing and conduits, etc.

The cooling end plate 816 may be coupled to the first portion 822a of the cooling jacket 822 and may include at least one inner channel that is fluidically coupled (e.g., by external tubing/conduits) to the inner channels of the cooling jacket 822. Coolant flowing through the cooling jacket 822 may therefore also flow through the cooling end plate 816. The at least one inner channel of the cooling end plate 816 may also be fluidically coupled to an inner channel 824 of a stationary inner tube 826 enclosed within the rotor 806. The inner channel 824 may be fluidically coupled to the at least one inner channel of the cooling end plate 816 by, for example, external tubing/conduits, such that coolant is delivered to the inner tube 826 from the cooling end plate 816.

The rotor 806, similar to the rotor 706 of FIG. 7, may include a rotor shaft 806a which protrudes out of the second portion 822b of the cooling jacket 822 (e.g., through an opening in the second portion 822b) along the central axis of rotation 801 at a first end 828 of the rotor 806. A second, opposite end 830 of the rotor shaft 806a may be enclosed within a hub 832 of the electric motor 800. A rotor core 806b of the rotor 806 may be coupled to the rotor shaft 806a such that the rotor core 806b spins in unison with the rotor shaft 806a while spaced away from an inner surface of the stator core 804 by an air gap 807. A length of the rotor core 806b, e.g., along the central axis of rotation 801, may be similar to a length of the stator core 804 and shorter than a length of the rotor shaft 806a. The inner tube 826 arranged inside of the rotor 806 may extend between the first end 810 of the stator 802 and the hub 832 within the rotor shaft 806a, protruding beyond the second end 830 of the rotor 806, along the central axis of rotation 801. The inner tube 826 may engage directly with the hub 832, forming a sealed interface between the inner tube 826 and the hub 832.

The hub 832 may be a cover arranged perpendicular to the central axis of rotation 801 and coupled to a side of the electric motor 800 proximate to the welded set of end windings 812 and distal to the crown set of end windings 809. The coupling of the hub 832 to the side of the electric motor 800 may enable coolant to be sealed within the at least one channel of the cooling end plate 816. As shown in FIG. 8, various additional components of the electric motor 800 may be coupled to the hub 832, as well as to other regions of the electric motor 800 but are not described herein for brevity.

For the electric motor 800 of FIG. 8, a cooling system configured to deliver coolant to each of the rotor 806, the cooling end plate 816, and the cooling jacket 822 may not be a continuous circuit shared amongst the aforementioned components. For example, the cooling end plate 816 may include a first set of coolant ports (e.g., inlet and outlet), the rotor 806 may have a second set of coolant ports, and the first portion 822a of the cooling jacket 822 may have a third set of coolant ports. The sets of coolant ports may be fluidically coupled to one another via external tubing to connect the sets of ports in series. As such, the continuous cooling system of the electric motor 700 of FIG. 7 may have a higher consumer appeal due to a simplicity and compact footprint of the electric motor 700.

In this way, dissipation of heat at an electric motor is increased without incurring additional costs or increasing a weight of the electric motor. The electric motor may include one or more end plates adapted with indentations or slots for receiving end windings of the electric motor without directly contacting the end windings. The end windings may be encapsulated by a thermally conductive filler, e.g., a potting material, that is added to the indentations to stabilize the end windings and absorb vibrations. At least one of the one or more end plates may include at least one internal cooling channel fluidically coupled to a cooling jacket of the electric motor. The at least one internal cooling channel of the end plate may efficiently dissipate heat from the respective end windings, which may also cool bearings and seals in contact or within close proximity to the end plate. The at least one internal cooling channel may also be fluidically coupled to an internal cooling passage of a rotor of the electric motor. By incorporating the one or more end plates into the electric motor, with at least one of the end plates configured with at least one internal cooling channel, cooling of the electric motor may be increased via a low cost, simple system, that maintains a small footprint of the electric motor.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The disclosure also provides support for an electric motor, comprising: a stator with end windings protruding axially, along a central axis of rotation of the electric motor, from a first end of the stator, a first end plate arranged at the first end of the stator, the first end plate having an inner face with indentations configured to receive the end windings, the indentations including a thermally conductive material to interface with the end windings, and at least one cooling channel to flow a coolant. In a first example of the system, the first end plate is aligned perpendicular to the central axis of rotation of the electric motor, and wherein at least a portion of a length of the end windings is embedded into the indentations of the inner face without contacting surfaces of the indentations. In a second example of the system, optionally including the first example, spaces between the surfaces of the indentations and the end windings are occupied by the thermally conductive material and wherein the thermally conductive material is also electrically insulating. In a third example of the system, optionally including one or both of the first and second examples, the indentations are shaped as elongate recesses extending radially outwards from a center of the first end plate, around a region of the first end plate that aligns with the end windings along the central axis of rotation of the electric motor. In a fourth example of the system, optionally including one or more or each of the first through third examples, the first end plate has a central opening for receiving a rotor of the electric motor, and wherein a seal and bearings are located between the first end plate and the rotor. In a fifth example of the system, optionally including one or more or each of the first through fourth examples, the system further comprises: a second end plate coupled to a second end of the stator, opposite of the first end, the second end plate similarly configured as the first end plate and having indentations for receiving end windings protruding axially from the second end of the stator, and wherein at least one of the end windings protruding from the first end and the second end of the stator are welded tips. In a sixth example of the system, optionally including one or more or each of the first through fifth examples, the at least one cooling channel of the first end plate is fluidically coupled to a cooling jacket of the electric motor and to an internal cooling passage of a rotor of the electric motor, and wherein the cooling jacket of the electric motor is fluidically coupled to a coolant circuit of a vehicle, the coolant circuit configured to circulate the coolant. In a seventh example of the system, optionally including one or more or each of the first through sixth examples, the coolant is electrically conductive and provides an electrical grounding path between a static part of the electric motor and a rotating part of the electric motor, and wherein the static part includes the stator and the rotating part includes at least a portion of a rotor of the electric motor.

The disclosure also provides support for an electric motor for a vehicle, comprising: a stator, a housing in contact with the stator, the housing including: a jacket circumferentially surrounding the stator, a first end plate positioned at a first end of the stator, and a second end plate positioned at a second end of the stator, opposite of the first end plate, the first and second end plates having respective inner faces configured with indentations extending outwards from a central axis of rotation of the stator, along radial directions, wherein the indentations are filled with an encapsulating filler to maintain a position of sets of end windings protruding from either end of the stator into the indentations of the first and the second end plates, respectively, to conduct heat, and to remove air from between each of the first end plate and the second end plate and the respective set of end windings. In a first example of the system, the first end plate and the second end plate are solid plates formed of aluminum, and wherein the first end plate is in contact with a first end of the jacket and the second end plate is in contact with a second end of the jacket, opposite of the first end. In a second example of the system, optionally including the first example, the electric motor is a radial flux electric motor. In a third example of the system, optionally including one or both of the first and second examples, at least one of the first end plate and the second end plate includes an internal cooling channel fluidically coupled to coolant channels of the jacket, and wherein a coolant flowing through the coolant channels of the jacket is delivered to the internal cooling channel from the coolant channels. In a fourth example of the system, optionally including one or more or each of the first through third examples, the internal cooling channel of at least one of the first end plate and the second end plate is fluidically coupled to an inner passage of a rotor of the electric motor, and wherein the coolant is delivered to the inner passage of the rotor from the internal cooling channel. In a fifth example of the system, optionally including one or more or each of the first through fourth examples, the internal cooling channel winds between the indentations in a respective inner face of at least one of the first end plate and the second end plate. In a sixth example of the system, optionally including one or more or each of the first through fifth examples, the end windings include points along the end windings with an insulating varnish removed at regions where the end windings are spaced away from one another to decrease a thermal resistance of the end windings. In a seventh example of the system, optionally including one or more or each of the first through sixth examples, the encapsulating filler is added to spaces around the end windings within a static region of the electric motor, in addition to spaces between the end windings and the indentations.

The disclosure also provides support for a vehicle, comprising: an electric motor having, a radial flux stator, the radial flux stator having hairpin end windings protruding axially from at least one end of the radial flux stator, a cooling system coupled to the radial flux stator, the cooling system having one or more end plates with a cooling channel for flowing an electrically conductive coolant, a surface configured with a plurality of indentations for receiving the hairpin end windings, and a flexible, thermally conductive material positioned between the hairpin end windings and the one or more end plates within the plurality of indentations. In a first example of the system, the hairpin end windings include a set of crown end windings and a set of welded end windings, the set of crown end windings and the set of welded end windings protruding from opposite ends of the radial flux stator, and wherein an end plate of the one or more end plates is coupled to the set of welded end windings. In a second example of the system, optionally including the first example, at least a portion of a length of the set of welded end windings is recessed into the plurality of indentations of the end plate without directly contacting surfaces of the plurality of indentations, and wherein the flexible, thermally conductive material absorbs vibrations and inhibits transmission of the vibrations to the set of welded end windings. In a third example of the system, optionally including one or both of the first and second examples, the one or more end plates are coated with an insulating layer.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric motor, comprising:
   a stator with end windings protruding axially, along a central axis of rotation of the electric motor, from a first end of the stator; and
   a first end plate arranged at the first end of the stator, the first end plate having an inner face with a plurality of indentations configured to receive the end windings, the plurality of indentations including a thermally conductive material to interface with the end windings, and at least one cooling channel to flow a coolant,
   wherein the hairpin end windings include a set of crown end windings and a set of welded end windings, the set of crown end windings and the set of welded end windings protruding from opposite ends of the stator, wherein the first end plate is coupled to the set of welded end windings, wherein at least a portion of a length of the set of welded end windings is recessed into the plurality of indentations of the first end plate without directly contacting surfaces of the plurality of indentations, and wherein the flexible, thermally conductive material absorbs vibrations and inhibits transmission of the vibrations to the set of welded end windings.

2. The electric motor of claim 1, wherein the first end plate is aligned perpendicular to the central axis of rotation of the electric motor.

3. The electric motor of claim 2, wherein spaces between the surfaces of the plurality of indentations and the end windings are occupied by the thermally conductive material, and wherein the thermally conductive material is also electrically insulating.

4. The electric motor of claim 1, wherein the plurality of indentations are shaped as elongate recesses extending radially outwards from a center of the first end plate, around a region of the first end plate that aligns with the end windings along the central axis of rotation of the electric motor.

5. The electric motor of claim 1, wherein the first end plate has a central opening for receiving a rotor of the electric motor, and wherein a seal and a bearing are located between the first end plate and the rotor.

6. The electric motor of claim 1, further comprising a second end plate coupled to a second end of the stator, opposite of the first end, the second end plate similarly configured as the first end plate and having indentations for receiving end windings protruding axially from the second end of the stator.

7. The electric motor of claim 1, wherein the at least one cooling channel of the first end plate is fluidically coupled to a cooling jacket of the electric motor and to an internal cooling passage of a rotor of the electric motor, and wherein the cooling jacket of the electric motor is fluidically coupled to a coolant circuit of a vehicle, the coolant circuit configured to circulate the coolant.

8. The electric motor of claim 7, wherein the coolant is electrically conductive and provides an electrical grounding path between a static part of the electric motor and a rotating part of the electric motor, and wherein the static part includes the stator and the rotating part includes at least a portion of a rotor of the electric motor.

9. An electric motor for a vehicle, comprising:
   a stator;
   a housing in contact with the stator, the housing including:
      a jacket circumferentially surrounding the stator;
      a phase bus bar;
      a first end plate positioned at a first end of the stator; and
      a second end plate positioned at a second end of the stator, opposite of the first end plate, the first and second end plates having respective inner faces configured with indentations extending outwards from a central axis of rotation of the stator, along radial directions;
   wherein the indentations are filled with an encapsulating filler to maintain a position of sets of end windings protruding from either end of the stator into the indentations of the first and the second end plates, respectively, to conduct heat, and to remove air from between each of the first end plate and the second end plate and the respective set of end windings; and
   wherein an inner face of one of the first end plate and the second end plate includes a first slotted through-hole and a second slotted through-hole to enable coupling to a phase bus bar, at least a portion of the indentations positioned between the first slotted through-hole and the second slotted through-hole.

10. The electric motor of claim 9, wherein the first end plate and the second end plate are solid plates formed of aluminum, and wherein the first end plate is in contact with a first end of the jacket and the second end plate is in contact with a second end of the jacket, opposite of the first end.

11. The electric motor of claim 9, wherein the electric motor is a radial flux electric motor.

12. The electric motor of claim 9, wherein at least one of the first end plate and the second end plate includes an internal cooling channel fluidically coupled to coolant channels of the jacket, and wherein a coolant flowing through the coolant channels of the jacket is delivered to the internal cooling channel from the coolant channels.

13. The electric motor of claim 12, wherein the internal cooling channel of at least one of the first end plate and the second end plate is fluidically coupled to an inner passage of a rotor of the electric motor, and wherein the coolant is delivered to the inner passage of the rotor from the internal cooling channel.

14. A vehicle, comprising:
an electric motor, having:
a radial flux stator, the radial flux stator having hairpin end windings protruding axially from at least one end of the radial flux stator; and
a cooling system coupled to the radial flux stator, the cooling system having one or more end plates with a cooling channel for flowing an electrically conductive coolant, a surface configured with a plurality of indentations for receiving the hairpin end windings, and a flexible, thermally conductive material positioned between the hairpin end windings and the one or more end plates within the plurality of indentations, wherein the hairpin end windings include a set of crown end windings and a set of welded end windings, the set of crown end windings and the set of welded end windings protruding from opposite ends of the radial flux stator, wherein an end plate of the one or more end plates is coupled to the set of welded end windings, wherein at least a portion of a length of the set of welded end windings is recessed into the plurality of indentations of the end plate without directly contacting surfaces of the plurality of indentations, and wherein the flexible, thermally conductive material absorbs vibrations and inhibits transmission of the vibrations to the set of welded end windings.

15. The vehicle of claim 14, wherein the one or more end plates are coated with an insulating layer.

* * * * *